Sept. 9, 1924.
E. C. LOVEJOY
MIXING MACHINE
Filed Oct. 2, 1922
1,508,109
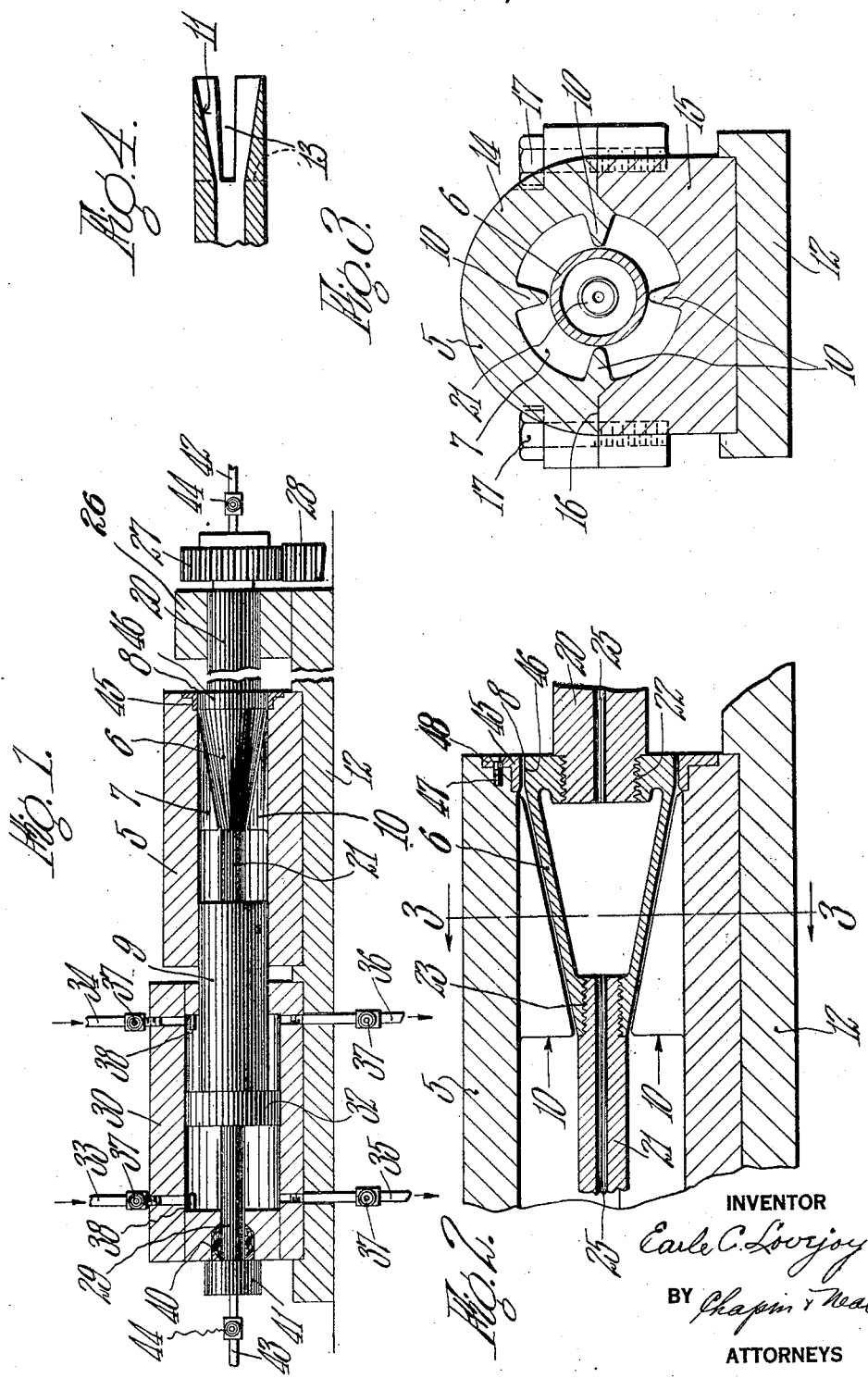
INVENTOR
Earle C. Lovejoy
BY Chapin & Neal
ATTORNEYS Patented Sept. 9, 1924.

1,508,109

UNITED STATES PATENT OFFICE.

EARLE C. LOVEJOY, OF SPRINGFIELD, MASSACHUSETTS.

MIXING MACHINE.

Application filed October 2, 1922. Serial No. 591,899.

*To all whom it may concern:*

Be it known that I, EARLE C. LOVEJOY, a citizen of the United States, residing at Springfield, in the county of Hampden and State of Massachusetts, have invented new and useful Improvements in Mixing Machines, of which the following is a specification.

The present invention relates to mixing machines and more particularly to machines for mixing powdered or granular material with plastic or viscous material.

Although not necessarily limited thereto, the invention is especially adapted for use in the manufacture of soft vulcanized rubber to mix a filler and a vulcanizing agent with the crude rubber, preparatory to the performance of the vulcanizing operation. This mixing operation has heretofore commonly been accomplished with the aid of cylindrical mixing rolls which are arranged in pairs, and driven slowly in opposite directions so as to squeeze or kneed the rubber between them. In using these mixing rolls, a batch of crude rubber is presented to the bite of the rolls and as the rolls rotate a relatively small quantity of rubber is drawn from the batch and wrapped around the rolls forming a coating or layer thereon while the greater part of the rubber remains in a wedge-like mass formation that is supported adjacent the bite of the rolls by the pulling or rubbing action of the rolls upon the exterior of the mass. The filler and the vulcanizing agent, which are in powdered form, are applied to the mass from time to time by an attendant. As the rolls rotate a small portion only of the coating or layer carried by each roll is acted upon at a time this being the portion which is passing across the surface of the wedge-like mass and between the cooperating rolls. In the performance of the above described operation there is no certainty that all parts of the mass operated upon will be subjected to the same amount of kneading or squeezing action and some parts are liable to be less thoroughly mixed than others. Consequently, the component elements are not uniformly mixed throughout the entire mass of the product and the character of the latter varies more or less in different portions thereof and at different times. The kneading or mixing operation, moreover, is restricted to that portion of the rubber which is located between or immediately adjacent the bite of the rolls, so that only a very small amount of material relatively to the size of the mass is subjected to the mixing action at any particular time and consequently the output of the machine is small considering its size and the amount of power required to operate the same.

One object of the present invention is to provide an improved machine or device of the general nature above mentioned which will effectively and thoroughly mix the materials supplied thereto in such a manner as to insure absolute uniformity in the character of the product.

Another object of the invention is to provide a mixing machine of the character specified which will produce a greater quantity of properly mixed material per unit of time and in proportion to its capacity than machines of this nature heretofore employed.

With the above object in view one feature of the present invention consists in the provision, in a mixing machine having a receptacle for the material to be mixed, of a driven mixing roll within said receptacle, and means for compressing the material within said receptacle while said roll is being driven.

The invention further consists in the features of construction and in the combinations and arrangements of parts hereinafter described and claimed, the advantages of which will be obvious to those skilled in the art.

The invention will be explained in connection with the accompanying drawings illustrating what is at present considered to be its preferred form.

In the drawings:

Fig. 1 is a longitudinal sectional view of the improved mixing machine;

Fig. 2 is a detail view, in longitudinal section and on an enlarged scale, showing the mixing roll and the tapering chamber or passage in which the mixing is accomplished;

Fig. 3 is a sectional view taken along the line 3—3 of Fig. 2; and

Fig. 4 is a fragmentary longitudinal sectional view of a modified form of plunger for compressing the material to be operated upon.

Referring to the drawings, the mixing machine therein shown comprises, in general, a stationary cylinder 5 into which the material to be mixed is deposited; a conical mixing roll or rotor 6 within and coaxial with the cylinder 5, and arranged to provide a tapering mixing passage 7 between the roll and the cylinder wall, said passage terminating in a narrow annular outlet port 8 encircling the large end of the mixing roll; means for supporting and driving the mixing roll; a hydraulic piston 9 movable in the cylinder 5 for compressing the material contained within the latter and forcing it against the surface of the mixing roll so that it will be softened, mixed and finally discharged through the outlet port 8; and a plurality of fins or ribs 10 projecting from the inside of the stationary cylinder 5 into the tapering mixing passage 7 to prevent rotation of the mass of material in said passage under the influence of the rotating mixing roll.

The cylinder 5 is arranged with its axis horizontal and is rigidly secured upon a suitable support 12. The bore or chamber within the cylinder 5 extends through both ends of the cylinder, the piston 9 projecting into said chamber at one end of the cylinder while the conical mixing roll 6 is located in said chamber adjacent the opposite end of the cylinder. The large end of the mixing roll 6 closes the respective end of the cylinder 5 except for the narrow annular outlet port 8 between the roll and the cylinder wall. The walls of the cylinder 5 are made thick and strong to withstand the internal pressure created by the action of the piston 9 upon the material to be mixed as will hereinafter appear. Preferably the cylinder 5 is cast in two parts 14 and 15 (Fig. 3) divided at 16 along the horizontal axial plane of the cylinder and removably secured together by means such as the bolts 17. This construction enables the upper section 14 of the cylinder to be removed to facilitate the loading into the cylinder of the material to be operated upon. The fins 10 are formed on the inside of the mixing cylinder wall and extend lengthwise thereof, their longitudinal edges being parallel with the conical surface of the rotor and arranged closely adjacent thereto. The fins thus project into the mass of material in the tapering mixing chamber and prevent said material from being rotated bodily under the influence of the driven mixing roll.

The mixing roll or rotor 6 consists of a hollow shell having a smooth outer surface of the tapering or conical form clearly shown in the drawings. It may be found advantageous, however, to modify the shape of the mixing roll more or less from that shown. For example, it may prove desirable to increase or diminish the pitch of the side walls, either throughout the entire length of the roll or through a portion only of its length, or it may be desirable to curve the side walls somewhat longitudinally of the roll. The roll 6 is provided with trunnions or shaft sections 20 and 21 the axes of which are alined and coincident with the rotational axis of the roll. As shown, the trunnions 20 and 21 are screw-threaded at 22 and 23 into the opposite ends of the roll 6 and each trunnion is provided with a central bore 25 which extends throughout its length and communicates with the hollow interior of the roll thereby providing for the passage of water or other cooling medium to and from the roll. The trunnion or shaft section 20 is journaled in a bearing 26 which is arranged to support the roll in coaxial relation to the cylinder 5. The trunnion 20 extends beyond the bearing 26 and has rigidly secured to its projecting end a pinion 27 which is adapted to be driven from any suitable source of power through driving connections exemplified by the gear 28 which meshes with said pinion. The trunnion 21, which projects from the small end of the roll 6 extends through an axial bore in the piston 9 and through a bearing 29 in the end wall of a hydraulic cylinder 30 which is associated with the piston 9. The piston 9 is slidable in the cylinders 5 and 30 and on the trunnion 21 and provides an additional bearing for said trunnion. The hydraulic cylinder 30 is of greater diameter than the mixing cylinder 5 and the piston 9 is provided with an enlarged end 32 which fits the cylinder 30. The cylinder 30 is provided with inlet pipes 33 and 34 adjacent opposite ends thereof for admitting water to said cylinder at opposite sides of the enlarged end 32 of the piston 9. The cylinder 30 is also provided with outlet pipes 35 and 36 for the exhaust of water from said cylinder. Suitable valves 37 are provided in the inlet and outlet pipes above mentioned to control the passage of water therethrough. Suitable stops 38 at opposite ends of the hydraulic cylinder limit the stroke of the piston 9 and prevent the enlargement 32 thereof from shutting off communication with the inlet and outlet pipes. A stuffing box 40 is provided in the end wall of the cylinder 3, adjacent the bearing 29, to prevent outward leakage of water around the trunnion 21 and a similar stuffing box (not shown) may be provided for the same purpose within the hollow piston 9. It will be apparent that by opening the valves in the inlet and outlet pipes 33 and 36 and closing the valves in the pipes 34 and 35 the piston 9 may be moved toward the mixing roll 6 to force the material in the cylinder 5 through the tapering mixing passage 7, and that by reversing the condition of the valves in said inlet and outlet pipes the cylinder 9 may be retracted from the mixing roll 6 to permit the introduction into the cylinder 5 of a new supply of material to be operated upon. The trunnion 21 projects beyond the stuffing box 40 and has rigidly secured thereto a collar 41 which bears against the adjacent end wall of the cylinder 30 to take the end thrust imposed upon the mixing roll 6 by the material which is being forced through the passage 7 by the action of the piston 9.

The hollow trunnions 20 and 21 are connected with pipes 42 and 43 for conveying water or other cooling fluid to and from said trunnions, respectively, to insure a circulation of the fluid through the mixing roll 6. By thus providing for the cooling of the mixing roll the latter may be driven at increased speed without causing the rubber or other material being operated upon to become heated to such an extent as to be injurious to the product. The circulation through the mixing roll is controlled by means of valves 44 in the pipes 42 and 43, thus enabling the temperature of the material being mixed to be regulated at will.

In using the above described machine to operate upon crude rubber it may be found advisable to start the process of mixing the rubber with the filler and the vulcanizing agent in the usual manner by subjecting the same to the squeezing action of one or more pairs of cylindrical mixing rolls and to remove the material from these rolls after a preliminary mixing of the component elements has been effected and to deposit the partially or imperfectly mixed product into the cylinder 5 of the present machine where the mixing operation is to be completed. It is to be understood, however, the present machine is not limited in its use to operation upon materials which have been partially mixed together inasmuch as the component elements of the mixture may be introduced separately into the cylinder 5 if desired and the mixing process both started and finished therein.

After the material to be operated upon has been introduced into the cylinder 5, the mixing roller 6 is rotated and the hydraulic piston 9 actuated to slowly advance the material through the cylinder 5, toward the right in Fig. 1. The action of the piston 9 causes the material to be crowded into the tapering passage 7 and compressed against the walls of the cylinder 5 and the conical surface of the mixing roll 6. The material is prevented from rotating, under the influence of the roll by means of the fins 10. The rotation of the roll subjects the compressed material which is in contact therewith to a frictional rubbing and grinding action which raises the temperature of the rubber, softens it and thoroughly mixes with it the filler and such other materials as may have been previously added thereto.

After a relatively thin layer of rubber adjacent the surface of the mixing roll has become softened and thoroughly mixed, it will be forced longitudinally along the tapering surface of the roll and extruded through the outlet post 8. It should be understood that the pressure within the cylinder 5 is not sufficient to force the unsoftened and unmixed rubber through the outlet port and that it is only after the rubber has become softened and thoroughly mixed with the filler that the pressure is effective to force it out of the cylinder through the outlet port 9. As the softened rubber is forced along the surface of the roll toward the outlet port, its place is taken by unsoftened rubber from the mass in the mixing cylinder and this rubber, in turn, becomes heated, softened and mixed and finally forced out through the port 8.

The mixture is discharged through the annular outlet port 8 in the form of a continuous tube. The rotation of the roll causes the tubular product to rotate as it leaves the cylinder and the advancing tube may conveniently be cut into a strip by means of a stationary knife or cutting edge properly located with respect thereto. The strip may then be conveniently wound upon a suitable reel or rack.

A hardened ring 45 may be set in the inner surface of the cylinder 5, at the discharge end thereof to provide a perfectly smooth hard surface to cooperate with a cylindrical portion 46 at the large end of the mixing roll and thus to insure the production of smooth surfaces on the strip of rubber issuing from the mixing cylinder. The thickness of the strips or sheets produced by the machine is determined by the width of the annular outlet port 8. In order that the thickness of the product may be varied more or less as desired, the present invention contemplates the provision of a plurality of rings 45, each having a different internal diameter, said rings being adapted to be interchangeably secured to the cylinder 5, so that by selectively using the rings 45 the thickness of the strip produced may be varied at will. To enable the strip forming rings 45 to be removably secured in place on the cylinder 5 said rings may be provided, as shown, with an external annular rib or flange 48 which is adapted to be secured to the end of the cylinder wall by means such as the screws 47.

The plunger 9 shown in Fig. 1 is formed with a blunt or flat end face for engaging the material to be compressed and when at the limit of its working stroke said face is located adjacent the small end of the mixing roll. Consequently it will be seen that no provision is made for ejecting the material from the tapering passage 7 until a new supply has been loaded into the cylinder 5 behind the remnant remaining in the tapering passage after which said remnant may be discharged with the new supply of material. The new material however, may be of a different quality from the remnant of the preceding batch previously operated upon, in which case it may be undesirable to intermix the two different materials. For this reason provision may be made for completely discharging the material from the cylinder 5. To this end the piston 9 may be constructed as illustrated in Fig. 4, having its end tapered as shown at 11 to fit closely within the annular space 7 around the mixing roll when said piston is at the limit of its working stroke so as to displace all material from this passage. The tapered end of the piston 9 will be appropriately notched, as shown at 13 to receive the radial fins 10 and suitable provision will be made to prevent turning of said piston so as to insure registration of said notches and fins.

While in the herein illustrated embodiment of the invention, a cylindrical receptacle and a tapering mixing roll have been shown, the invention is not in any sense restricted to the use of a mixing roll of tapering form inasmuch as many of the advantages of the invention may be obtained by the use of a cylindrical mixing roll which is mounted in a receptacle of any shape which is provided with means whereby the material contained within the receptacle may be subjected to pressure while it is being acted upon by the mixing roll. If a cylindrical roll is employed it is preferable, although not essential, that the walls of the mixing cylinder shall be inclined with respect to the cylindrical surface of the mixing roll so that the pressure will act to greatest advantage upon the mass of material and be properly distributed therethrough. It is also within the scope of the invention to provide for the application of direct pressure to the material being operated upon by the mixing roll in a path either inclined or at right angles to the surface of said roll. In any case the outlet port through which the mixed materail is discharged will be so located with respect to the working surface of the mixing roll that the material immediately adjacent said surface will be readily forced directly through said outlet port by the pressure within the mixing chamber.

A machine embodying the present invention is not limited in its use to the mixing of rubber with other materials nor to the mixing together of two or more materials of different characteristics inasmuch as it may be used with advantageous results for operating upon various substances of a more or less hard viscous nature, for the purpose of softening them and converting them into a homogeneous mass in preparation for further operation to be subsequently performed upon them.

It will be seen that throughout the operation of the machine the entire conical or tapering surface of the mixing roll is continuously acting upon the material and as a result a given amount of material may be properly mixed in much less time than is possible with the use of cylindrical mixing rolls. Furthermore all portions of the mass of material in the cylinder 7 will be acted upon in the same manner and to the same extent by the mixing roll 6 thus providing for even mixing throughout the mass and insuring a uniform product. Inasmuch as the present machine enables a more thorough and uniform mixing to be accomplished, it becomes practicable with the use of given quantity of filler per unit volume of rubber to produce a better quality of rubber by means of the present machine than could be obtained by means of mixing machines heretofore employed. On the other hand, if it is not desired to improve the quality of the rubber produced, the use of the present machine enables a greater quantity of filler to be used than heretofore in proportion to the quantity of rubber employed without producing an inferior grade of rubber. Obviously, this expedient reduces the expense of manufacturing since it requires the use of less rubber per unit volume of the finished product.

The invention has been disclosed herein for illustrative purposes in an embodiment at present preferred but the scope of the invention is to be determined from the appended claims rather than from the foregoing description.

What I claim is:

1. In a machine for operating upon viscous material, a receptacle for the material to be operated upon, provided with an outlet port for said material, a driven roll within said receptacle for acting upon the material therein said roll providing a tapering mixing passage for said material, and means for applying pressure to said material while being acted upon by said roll, said outlet port being arranged at one end of said roll and in alinement with the direction of the forces derived from said pressure applying means that the material will be discharged through said port immediately after being acted upon by said roll.

2. In a mixing machine, a receptacle for the material to be mixed, a driven mixing roll within said receptacle, said roll being larger at one end than at the other and being arranged relatively to the walls of the receptacle to provide a tapering annular mixing passage for said material, said passage terminating in an annular outlet port at one end of the cylinder, and means for compressing said material within said passage.

3. In a mixing machine, a receptacle for the material to be mixed, a driven mixing roll within said receptacle, said roll being larger at one end than at the other and being arranged relatively to the walls of the receptacle to provide a tapering annular mixing passage for said material, said passage terminating in an annular outlet port at one end of the cylinder, and means for compressing said material within said passage, said means being constructed and arranged to insure the discharge from said receptacle of the entire contents thereof.

4. In a mixing machine, a receptacle for the material to be mixed, a driven mixing roll of substantially conical form within said receptacle arranged relatively to the walls thereof to provide a tapering annular mixing passage for said material, said passage terminating in an annular outlet port at one end of the cylinder, means for compressing said material within said passage, and one of a plurality of members of different sizes adapted to be interchangeably associated with said machine to vary the width of said outlet port.

5. In a mixing machine, a cylinder for receiving the material to be mixed, a conical rotor within and coaxial with the cylinder and arranged adjacent one end thereof to provide a mixing passage annular in cross-section and tapering toward said end of the cylinder, said rotor closing said end except for an annular outlet at the small end of said passage, means for driving the rotor, and a piston reciprocable in the opposite end of the cylinder for compressing said material within said tapering passage and effecting its discharge through said outlet.

6. In a mixing machine, a cylinder for receiving the material to be mixed, a conical rotor within and coaxial with the cylinder and arranged adjacent one end thereof to provide a mixing passage annular in cross-section and tapering toward said end of the cylinder, said rotor closing said end except for an annular outlet at the small end of said passage, means for driving the rotor, and a piston reciprocable in the opposite end of the cylinder for compressing said material within said tapering passage and effecting its discharge through said outlet, said piston being constructed and arranged to completely exhaust the material from said cylinder when at the limit of its working stroke.

7. In a mixing machine, a cylinder for receiving the material to be mixed, a substantially conical rotor within and coaxial with the cylinder and arranged adjacent one end thereof to provide a mixing passage annular in cross-section and tapering toward said end of the cylinder, said rotor closing said end except for an annular outlet at the small end of said passage, means for driving the rotor, a piston reciprocable in the opposite end of the cylinder for compressing said material within said tapering passage and effecting its discharge through said outlet, and one of a plurality of rings of different internal diameters adapted to be interchangeably secured to said cylinder to vary the width of said outlet.

8. In a mixing machine, a receptacle for the material to be mixed, a driven mixing roll of conical form within said receptacle arranged relatively to the walls thereof to provide a tapering annular mixing passage for said material, said passage terminating in an annular outlet port at one end of the cylinder, means on said receptacle projecting into said mixing passage to prevent the material therein from rotating bodily under the influence of said driven mixing roll, and means for forcing said material through said passage after it has been acted upon by said roll.

9. In a mixing machine, a receptacle for the material to be mixed, a driven mixing roll of conical form within said receptacle arranged relatively to the walls thereof to provide a tapering annular mixing passage for said material, said passage terminating in an annular port at one end of the cylinder, a fin projecting inwardly from the wall of said cylinder and extending lengthwise thereof, said fin closely approaching the conical surface of the roll and serving to prevent rotation of the mass of material in said passage under the influence of the driven mixing roll, and means for forcing said material through said passage after it has been acted upon by said roll.

10. In a mixing machine, a cylinder for receiving the material to be mixed, a conical rotor within and coaxial with the cylinder and arranged adjacent one end thereof to provide a mixing passage annular in cross-section and tapering toward said end of the cylinder, said rotor closing said end except for an annular outlet at the small end of said passage, means for driving the rotor, a plurality of fins projecting from the inside of said cylinder and extending lengthwise thereof, said fins having their longitudinal edges extending parallel with the conical surface of the rotor and arranged closely adjacent thereto to prevent the mass of material in said passage from rotating bodily with the rotor, means for driving the rotor, and means for forcing said material through said passage after it has been acted upon by said rotor and causing it to be discharged through said outlet.

11. In a mixing machine, a cylinder for receiving the material to be mixed, a hollow conical mixing roll within and coaxial with the cylinder and located adjacent one end thereof to provide a mixing passage annular in cross section and tapering toward said end of the cylinder, the large end of said roll closing the respective end of the cylinder except for a narrow annular outlet port, trunnions extending from opposite ends of said roll, bearings for said trunnions, means for driving the roll, means for supplying cooling fluid to the interior of said roll, and means operative during the rotation of said roll for forcing said material through the space surrounding the roll after it has been acted upon by the latter and effecting the final discharge of the material through said outlet port.

12. In a mixing machine, a cylinder for receiving the material to be mixed, a hollow conical mixing roll within and coaxial with the cylinder and located adjacent one end thereof to provide a mixing passage annular in cross section and tapering toward said end of the cylinder, the large end of said roll closing the respective end of the cylinder except for a narrow annular outlet port, trunnions extending from opposite ends of said roll, said trunnions being hollow and adapted to conduct cooling fluid to and from the interior of said roll, bearings for said trunnions, means for controlling the flow of fluid through said trunnions and roll, and means for driving said roll.

13. In a mixing machine, a cylinder for receiving the material to be mixed, a conical rotor within and coaxial with the cylinder and arranged adjacent one end thereof to provide a mixing passage annular in cross-section and tapering toward said end of the cylinder, said rotor closing said end except for an annular outlet at the small end of said passage, means for driving the rotor, a piston one end of which is reciprocable in said cylinder and adapted to force said material through said tapering passage after it has been acted upon by said rotor, a hydraulic cylinder for receiving the other end of said piston, and means for supplying water to said hydraulic cylinder and exhausting water therefrom for the purpose of actuating said piston.

In testimony whereof I have affixed my signature.

EARLE C. LOVEJOY.